United States Patent [19]

Cohen

[11] Patent Number: 4,750,647
[45] Date of Patent: Jun. 14, 1988

[54] NON-AEROSOL DISPENSER

[76] Inventor: Milton J. Cohen, 10823 Burbank Dr., Potomac, Md. 20854

[21] Appl. No.: 4,263

[22] Filed: Jan. 9, 1987

Related U.S. Application Data

[63] Continuation of Ser. No. 722,616, Apr. 12, 1985, abandoned.

[51] Int. Cl.$^4$ .............................................. B65D 35/22
[52] U.S. Cl. .................................. 222/386.5; 222/105; 222/387; 137/859; 141/23; 141/24; 141/25; 141/27
[58] Field of Search ................. 222/94, 105, 206, 212, 222/386.5, 95, 215, 211, 386, 387, 213; 137/859; 141/2, 3, 20–25, 27

[56] References Cited

U.S. PATENT DOCUMENTS

| | | | |
|---|---|---|---|
| 1,122,710 | 12/1914 | Feit | 222/387 X |
| 2,898,007 | 8/1959 | Gassaway | 222/387 X |
| 3,190,496 | 6/1965 | Weiland, Jr. et al. | 137/859 X |
| 3,722,756 | 3/1973 | Cramer, Jr. | 222/386.5 X |
| 3,773,233 | 11/1973 | Souza | 222/490 |
| 3,838,796 | 10/1974 | Cohen | 222/105 |
| 3,940,026 | 2/1976 | Kain | 222/212 |
| 4,121,737 | 10/1978 | Kain | 222/212 |
| 4,182,355 | 1/1980 | Briel et al. | 137/859 X |

Primary Examiner—H. Grant Skaggs
Assistant Examiner—David H. Bollinger
Attorney, Agent, or Firm—Jones, Day, Reavis & Pogue

[57] ABSTRACT

A non-aerosol liquid dispenser comprising a container having a preformed elastomeric diaphragm secured therein. The diaphragm stretches during filling of the container to create a return force which causes dispensing when a manually operated valve is actuated. The diaphragm includes a one-way valve which, during filling of the container, operates to permit air trapped beneath the diaphragm to enter the space above the diaphragm where the liquid is being supplied. The trapped air is expelled during the first actuation of the manually operated valve.

5 Claims, 2 Drawing Sheets

NON-AEROSOL DISPENSER

This application is a continuation of application Ser. No. 722,616, filed 4-12-85, now abandoned.

BACKGROUND OF THE INVENTION

This invention relates to a non-aerosol type fluid dispenser, which makes use of mechanical pressure generated by a flexible disk or diaphragm for ejection of a fluid in response to operation of a manually operable valve.

In my U.S. Pat. No. 3,838,796 description is made of a dispensing container having a flexible diaphragm secured at its periphery to the open upper end of the container. The container is subsequently sealed by a closure fitted with a dispensing valve. The diaphragm is stretched to substantially line the inner wall of the container and it is retained in the stretched condition by a latching means provided in the bottom wall of the container, releasably to grip an element projecting from the bottom side of the diaphragm when the diaphragm is in stretched position.

Fluid to be dispensed from the container is introduced into the interior of the stretched diaphragm through the open upper end of the container, in an amount substantially to fill the container. Thereafter, the cover is mounted in sealed relation to close the upper end of the container, to complete the dispensing package.

When it is desired to place the container into operation for dispensing the latch is operated from the outside to release its grip on the diaphragm thereby to release the stretched diaphragm for normal return to its relaxed position. Thus the diaphragm becomes effective to impose pressure on the fluid contained therein whereby such fluid is ejected from the container in response to the operation of the value and in amounts controlled thereby.

The dispenser just described adequately serves the purpose intended for it. However, it is desirable to provide a simplified design which eliminates the need for a latch to release the diaphragm.

In addition, it is desirable to eliminate the need to provide separate means for venting the air trapped in the container during filling. In the past it has been necessary to provide vents or other means for permitting the trapped air to escape as the diaphragm is stretched and the container filled.

It is accordingly an object of the present invention to permit filling of a non-aerosol container with the simultaneous elimination of trapped air.

A further object of the invention is to fill a non-aerosol container using existing assembly and filling equipment to maintain low cost.

An important object of non-aerosol containers is the elimination of the use of gas propellants, some of which are harmful to the atmosphere, others of which are fire hazards or medical risks in the case of health care products, particularly as concerns patients who suffer from emphysema, asthma, allergic reactions and the like. The present invention is a practical, low cost, effective, non-aerosol dispenser for liquids.

SUMMARY OF THE INVENTION

A preformed diaphragm is employed to force the liquid in the container out through a dispensing valve. The diaphragm includes a one way valve assembly which, during filling of the container, operates to permit air trapped beneath the diaphragm to enter the upper portion into which the liquid is being supplied whereby the air can pass out of the container. The air, trapped in the upper portion, is eliminated during the first operation of the dispensing valve.

DETAILED DESCRIPTION

Figure 1:
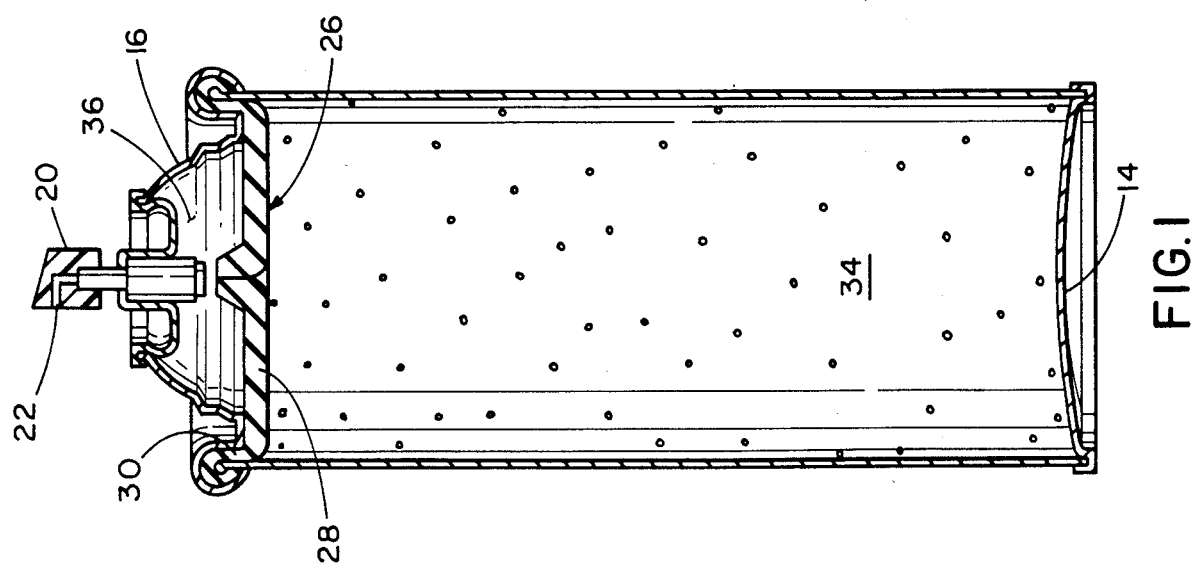
FIG. 1 is a cross sectional view of a dispenser according to the invention prior to filling.

Referring now to FIG. 1, the dispenser includes a housing 14 preferably in the form of a cylindrical container closed at the bottom and open at the top. The open top is adapted to be sealed by a cover 16 secured in sealing relationship about the open end of the housing. Various conventional means can be employed to secure the cover 16 to the container 14.

A manually operable dispensing valve 20 of conventional design is mounted on the top of the cover 16. This valve is conventionally employed in aerosol containers and includes a hollow tube 22 extending downwardly through the cover. The valve, when depressed, permits fluid to pass upwardly through the tube 22 and out the front of the valve through an opening therein communicating with tube 22.

According to the invention the pressurizing element is an elastomeric disk or diaphragm 26 secured in sealing relation across the open end of the can. The diaphragm may be secured in various ways as, for example, having its periphery clamped or otherwise captured in sealing relation between the cover 16 and housing 14. In the illustrated embodiment the diaphragm includes a horizontal portion 28 and a vertical portion 30, the latter extending upwardly to the point of engagement with the cover. The point of engagement is sufficiently below the top of the cover so as to prevent the tube 22 from interferring or damaging the diaphragm prior to filling the dispenser.

Figure 3:
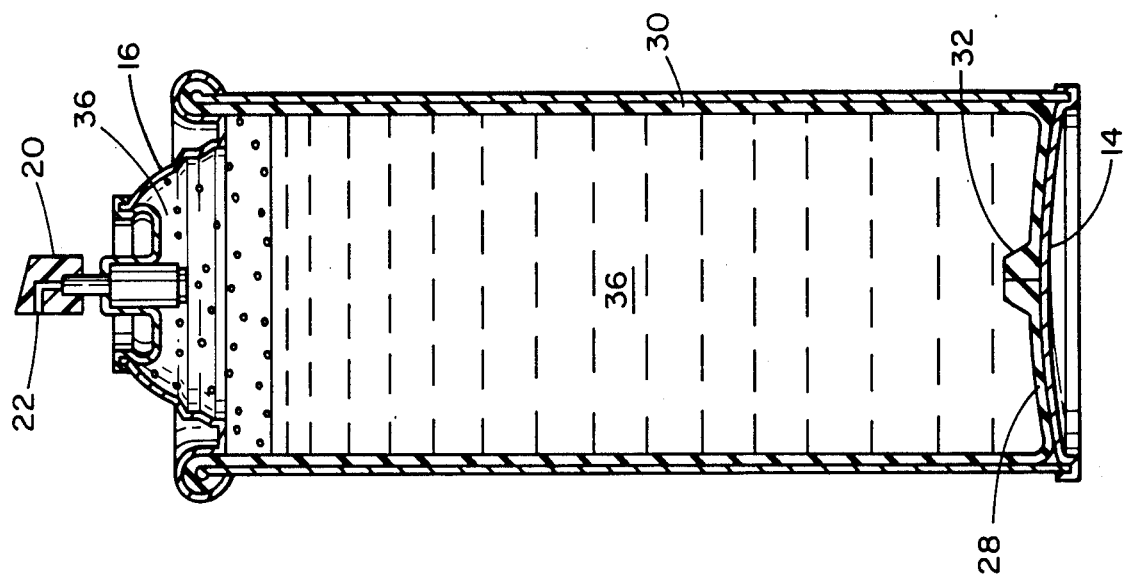
FIG. 3 is a view similar to FIG. 1 showing the dispenser in a completely filled, ready to dispense condition.
Figure 2:
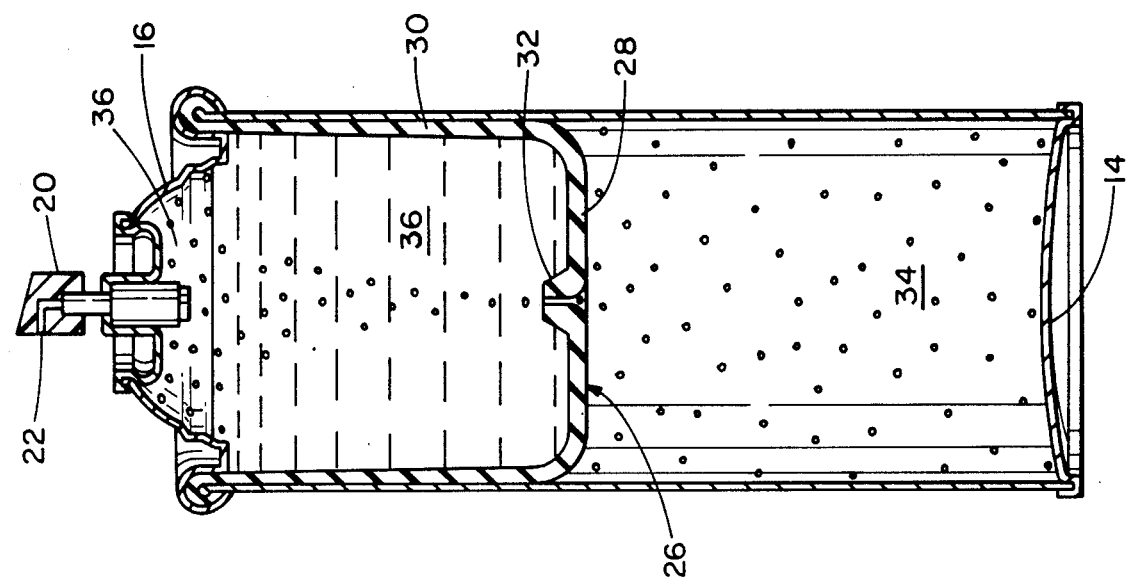
FIG. 2 is a view similar to FIG. 1 showing the dispenser in a partially filled condition.

The diaphragm or disk 26 is preferably preformed to the configuration shown in FIG. 1. In order to maintain this configuration the vertical portion, which endures most of the stretching during filling, may be thicker or reinforced as with spandex or otherwise enabled to endure the stretching involved in displacing the horizontal portion from the upper portion of the container to the lower portion of the container as illustrated in FIGS. 1-3. The horizontal portion of the diaphragm, defined by preformed corners, includes a one way valve assembly, preferably at a central location. The one way valve 32 of the first embodiment is sometimes referred to as a Gooch valve and consists of a preformed nozzle or hose portion extending upwardly toward the top of the container. The valve 32 is such that, under normal conditions, its inner surfaces engage to seal the passage between the lower portion of the container and the upper portion 36. As indicated in FIG. 2, during filling when liquid is forced into the upper portion 36 the diaphragm is forced downwardly in the container. As this occurs the trapped air in the lower portion 34 forces apart the walls of the valve 32 permitting it to pass upwardly into the upper portion 36. This process continues until, as shown in FIG. 3, the diaphragm is fully stretched and the container is substantially filled. At that time substantially all of the air will have been evacuated from the lower portion. That air, trapped at the top of the upper portion of the dispenser, is eliminated by brief operation of the dispensing valve after filling is complete. Thereafter the dispenser will be substantially free of air and will dispense the liquid contained therein on demand.

As will be apparent to those skilled in the art, once the trapped air has been evacuated from the lower chamber, the one way valve automatically closes rendering the diaphragm liquid tight allowing the contents to be dispensed by contraction of the diaphragm.

Figure 4:
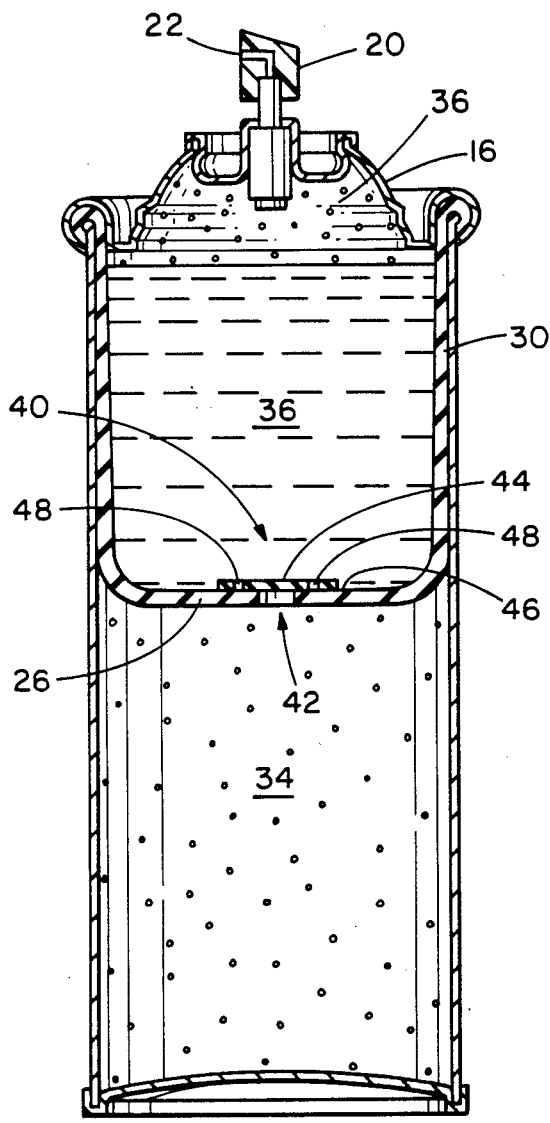
FIGS. 4 and 5 show an alternate embodiment of the one way valve associated with the diaphragm.
Figure 5:
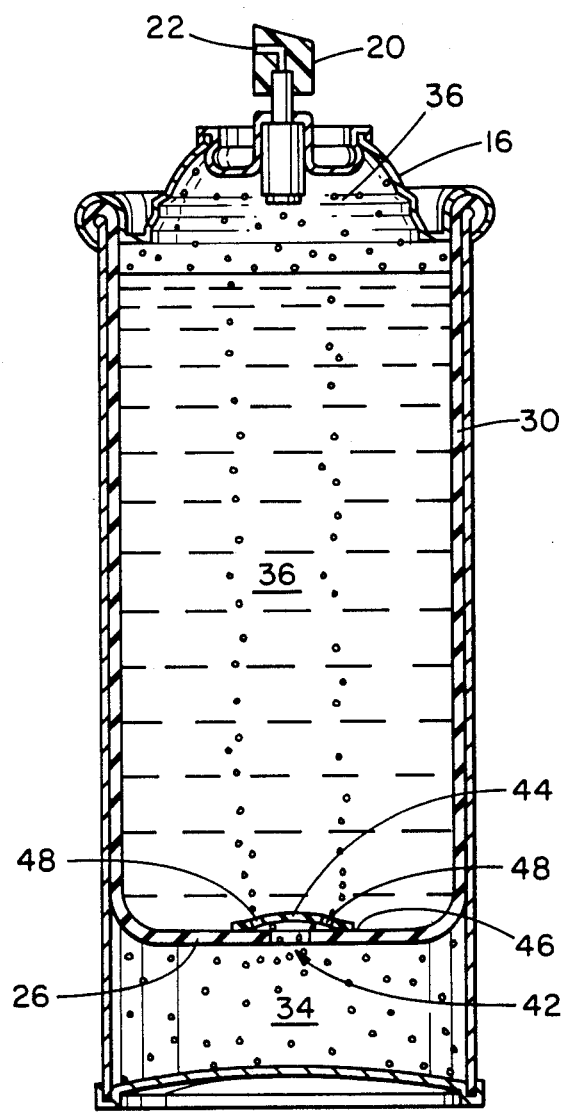

Referring to FIGS. 4 and 5, a second embodiment is disclosed. In this embodiment, in place of the Gooch type one way valve, an expandable flap valve 40 is employed. Specifically, the horizontal portion 26 of the disk has an aperture 42 therethrough whereby communication between the upper portion 36 and the lower portion 34 is established. Disposed over the opening 42 is an elastomeric flap 44 secured to the diaphragm 26 at its outer edges as at 46. The flap is sufficiently sized to completely cover the opening 42 when correctly positioned and tensioned thereacross. At least one and preferably two to four openings 48 are provided in the flap at a location removed from the opening 42. In fact, these openings are positioned between the points of attachment 46 and the opening 42. As shown in FIG. 4, normally the flap securely seals the opening 42 to prevent the passage of liquid. During filling, however, as shown in FIG. 5, as liquid enters the container and stretches the diaphragm, the air trapped in the lower portion 34 of the container deforms the flap upwardly away from the opening 42 eventually permitting communication between the opening 42 and the openings 48 in the flap. As with the first embodiment, this permits the trapped air to pass upwardly into the upper portion 36 and ultimately out of the dispenser.

The dispenser is then ready to be used. As is usual with dispensers of this class, a protective cap may be placed over the valve assembly to prevent accidental discharge during shipment. The diaphragm, formed of an elastomeric material, has an elastic memory thereby to impose a continuing pressure on the fluid trapped between the diaphragm and the cover 16. Thus, whenever the valve 20 is operated, the diaphragm pressurizes the fluid as it returns to the relaxed position.

As will be appreciated, depending upon the construction of the diaphragm 26, the dispenser according to the present invention may be refilled and repeatedly utilized to dispense fluid.

While I have shown and described embodiments of this invention in some detail, it will be understood that this description and illustrations are offered merely by way of example, and that the invention is to be limited in scope only by the appended claims.

I claim:

1. A non-aerosol dispenser comprising a container defining a space in which a liquid to be dispensed is received, said container having a bottom end and a dispensing end;
    an elastomeric diaphragm having a vertical portion, and a preformed, planar bottom portion which, in its unstretched state, conforms substantially to the cross-sectional area of said space, said diaphragm being secured to said container near said dispensing end and positioned so that during filling of the interior space above the diaphragm the entering liquid stretches the diaphragm downwardly, causing the diaphragm to conform substantially to the interior of said container and creating a return force on the liquid for dispensing;
    said diaphragm including valve means on said planar bottom portion for communicating air trapped beneath said diaphragm to said interior space; and
    a manually operable valve attached to the dispensing end of said container, said valve serving to expel the air trapped in said interior space upon first actuation of the valve and thereafter serving to dispense said liquid.

2. The dispenser of claim 1 wherein said valve means comprises a one way valve associated with said diaphragm whereby the trapped air can pass said diaphragm to said interior space but the liquid to be dispensed cannot pass to the space beneath said diaphragm.

3. The dispenser according to claim 1 wherein the one way valve is a Gooch type valve.

4. A non-aerosol dispenser comprising a container defining a space in which a liquid to be dispensed is received, said container having a bottom and a dispensing end;
    an elastomeric diaphragm having a vertical portion, and a preformed, planar bottom portion which, in its unstretched state, conforms substantially to the cross-sectional area of said space, said diaphragm being secured in sealing relation across said container near said dispensing end and positioned so that during filling of the interior space above the diaphragm the entering liquid stretches the diaphragm downwardly, causing the diaphragm to conform substantially to the interior of said container and creating a return force on the liquid for dispensing;
    said diaphragm including valve means on said planar bottom portion for communicating air trapped beneath said diaphragm to said interior space; and
    a manually operable valve attached to the dispensing end of said container, said valve serving to expel the air trapped in said interior space upon first actuation of the valve and thereafter serving to dispense said liquid.

5. The dispenser according to claim 4 wherein the one way valve is a Gooch type valve.

* * * * *